(12) United States Patent
Burton et al.

(10) Patent No.: US 8,385,245 B2
(45) Date of Patent: Feb. 26, 2013

(54) SYSTEM AND METHOD FOR MULTICASTING IN A NETWORK ENVIRONMENT

(75) Inventors: Joseph B. Burton, Livermore, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 595 days.

(21) Appl. No.: 12/270,628

(22) Filed: Nov. 13, 2008

(65) Prior Publication Data
US 2010/0118754 A1      May 13, 2010

(51) Int. Cl.
*H04B 7/212* (2006.01)

(52) U.S. Cl. ........................................ 370/312; 370/432

(58) Field of Classification Search .................. 370/312, 370/432
See application file for complete search history.

(56) References Cited

U.S. PATENT DOCUMENTS

| | | | |
|---|---|---|---|
| 6,640,251 B1 | 10/2003 | Wiget et al. | |
| 7,136,374 B1 | 11/2006 | Kompella | |
| 7,260,097 B2 | 8/2007 | Casey | |
| 7,281,058 B1 | 10/2007 | Shepherd et al. | |
| 7,283,465 B2 | 10/2007 | Zelig et al. | |
| 7,292,542 B2 | 11/2007 | Wright | |
| 7,339,925 B2 | 3/2008 | O'Neill et al. | |
| 7,366,894 B1 | 4/2008 | Kalimuthu et al. | |
| 7,386,010 B2 | 6/2008 | Solomon et al. | |
| 7,408,882 B2 | 8/2008 | Abdo et al. | |
| 2003/0074425 A1* | 4/2003 | Kawakita | 709/219 |
| 2003/0229900 A1* | 12/2003 | Reisman | 725/87 |
| 2004/0042479 A1* | 3/2004 | Epstein et al. | 370/432 |
| 2009/0150943 A1* | 6/2009 | Vasudevan et al. | 725/86 |
| 2009/0248886 A1* | 10/2009 | Tan et al. | 709/231 |

* cited by examiner

*Primary Examiner* — Sai-Ming Chan
(74) *Attorney, Agent, or Firm* — Patent Capital Group

(57) ABSTRACT

An apparatus is provided in one example embodiment and includes a content player that receives a request for content from an endpoint and evaluates whether a given portion of the content has already been multicasted. If the portion has been multicasted, then the endpoint is connected to a multicast version of the portion of the content, and if the portion has not been previously multicasted then the portion of content is added to a multicast transmission schedule. In more specific embodiments, the content player requests a piece of content from a content source and segments the piece of content into clips to be delivered to one or more endpoints. In still other embodiments, if the portion has not been previously multicasted then the portion of content is sent over a unicast channel.

20 Claims, 2 Drawing Sheets

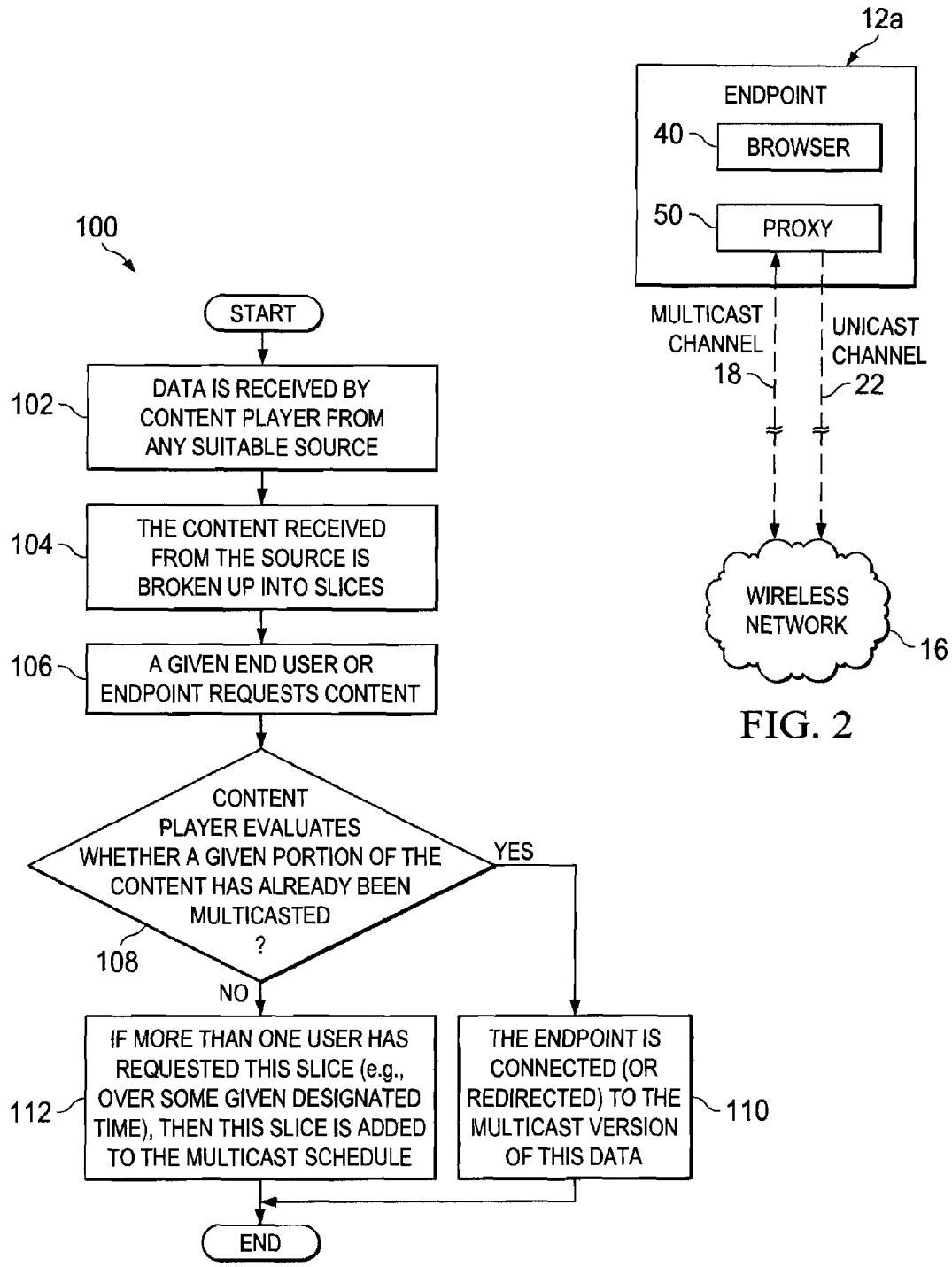

SYSTEM AND METHOD FOR MULTICASTING IN A NETWORK ENVIRONMENT

TECHNICAL FIELD OF THE INVENTION

This invention relates in general to the field of communications and, more particularly, to a system and a method for multicasting in a network environment.

BACKGROUND OF THE INVENTION

Networking services have become increasingly important in today's society. In certain architectures, service providers may seek to offer multicast services for their end users. 'Multicast' refers to the delivery of information to a group of destinations simultaneously using the most efficient strategy. Delivery of messages over each link of the network happens only once: creating copies only when the links to the destinations split.

Data transmission over cellular networks has traditionally been unicast. Recently, some companies have been advocating the use of multicast for transmitting content to given end user devices: either over a separate infrastructure or over a dedicated spectrum using the same infrastructure. This requires a custom client on the phone, custom applications, etc. and, hence, faces challenges in adoption.

Thus, the ability to develop a system or a protocol that offers an effective coordination for multicasting activities (without hindering system speeds, requiring unnecessary infrastructure, increasing overhead, or unduly taxing processing capabilities of network components) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a simplified block diagram of an endpoint for multicasting in a network environment in accordance with one embodiment of the present invention; and FIG. 3 is a simplified flowchart illustrating a series of example steps associated with the communication system.

DETAILED DESCRIPTION OF EXAMPLE EMBODIMENTS

Overview

Figure 1:
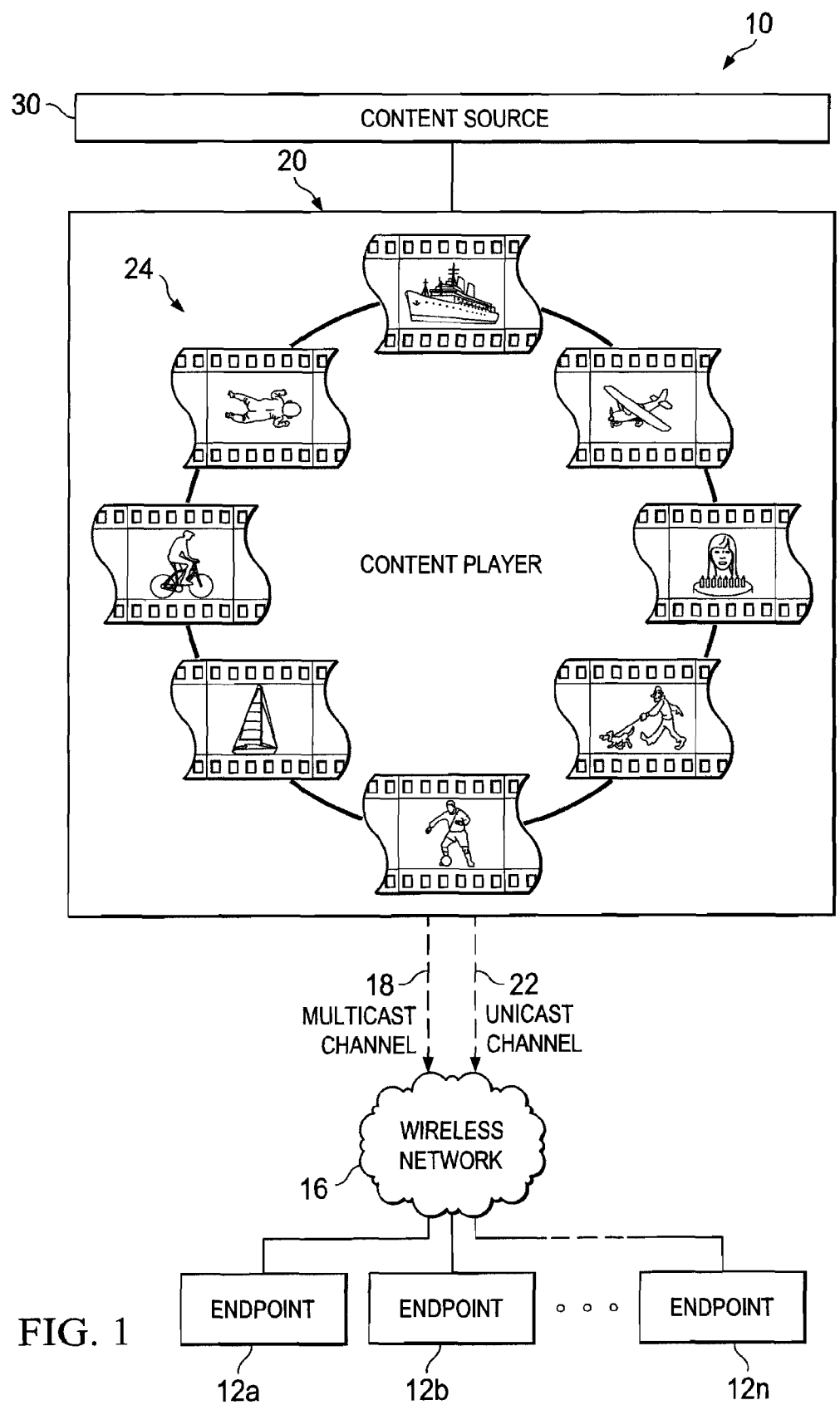
FIG. 1 is a simplified block diagram of a communication system for multicasting in a network environment in accordance with one embodiment of the present invention.

An apparatus is provided in one example embodiment and includes a content player that receives a request for content from an endpoint and evaluates whether a given portion of the content has already been multicasted. If the portion has been multicasted, then the endpoint is connected to a multicast version of the portion of the content, and if the portion has not been previously multicasted then the portion of content is added to a multicast transmission schedule. In more specific embodiments, the content player requests a piece of content from a content source and segments the piece of content into clips to be delivered to one or more endpoints. In still other embodiments, if the portion has not been previously multicasted then the portion of content is sent over a unicast channel. In yet other embodiments, the request is based on some subscription model, a previous query, or profile information of an end user associated with the endpoint. The endpoint can include a proxy that coordinates with the content player to receive the multicast version, where the proxy is coupled to a browser that enables the multicast version to be used by an end user of the endpoint.

Turning to FIG. 1, FIG. 1 is a simplified block diagram of a communication system 10 for coordinating multicasting activities in a network environment. FIG. 1 includes multiple endpoints 12*a-n*, which are coupled to a wireless network 16. Note that the numerical designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 10. In one example implementation, the endpoints are cellular telephones having multiple antennas for receiving and communicating data. Other types of endpoints are certainly within the broad scope of the present invention and some of these example endpoints are further described below.

Wireless network 16 is a wireless spectrum, which provides the wireless link over air in this example involving wireless technological devices. FIG. 1 also includes a content player 20 that includes a multicast channel 18 and a unicast channel 22 that couple to wireless network 16. A content source 30 is also provided in FIG. 1 and it is coupled to content player 20. Content player 20 has a multiplexing function [generally illustrated at 24], or some sort of segmenting ability such that a piece of content received (e.g., via content source 30) can be broken into clips.

These clips can form a loop of clips of content, as is illustrated in FIG. 1. For example, one movie, one television show, or one song can be divided into a ring of clips. The term 'clip' as used herein in this Specification is meant to connote any piece of data (e.g., voice, video, audio, etc.) that is broken or sliced into some logical part. The 'segmenting' operation, as discussed herein, includes any type of division, copying, breaking, multiplexing, replication, or manipulation of data. Additionally, the clip could be of any suitable timeframe (e.g., 30 seconds, 5 minutes, 2 hrs, etc.). In one example implementation, such an architecture could be employed in a content On-Demand type of scenario. In operation of a simplified example, content player 20 receives content (i.e. data), breaks it into slices, and then feeds those clips out to either multicast channel 18 or to unicast channel 22. Details regarding these activities and how such processing occurs are provided below.

Note that FIG. 1 may be generally configured or arranged to represent any communication architecture capable of exchanging packets in a network environment. Such configurations may include, for example, first generation, 2G, 2.5G, and 3G architectures that offer packet-exchanging capabilities. In addition, communication system 10 may include any suitable networking protocol or arrangement that provides a communicative platform for communication system 10. Thus, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

In accordance with the techniques and teachings of the present invention, communication system 10 provides a way of utilizing both multicast and unicast (seamlessly) to transmit data and content over a given medium (e.g., cellular to mobile phones). This can be accomplished using a standard browser interface. Furthermore, such a protocol can tune itself in response to actual bandwidth utilization. In terms of advantages, the system can be used with a variety of broadcast cellular technologies. It allows a standard mobile browser interface to be employed on the actual phone rather than using a custom client. In addition, the system allows for easy deployment by changing the percentage of spectrum devoted to broadcasting. As a separate matter, the system allows for higher spectral efficiency of broadcast, while capturing the long tail with unicast.

Before turning to some of the operations of this architecture, a brief discussion is provided about some of the infrastructure of FIG. 1. Endpoint 12*a* is a client or customer wishing to initiate a communication in communication system 10 via wireless network 16. In one example, it is a cellular telephone seeking to access content in a network. The term 'endpoint' may be inclusive of devices used to initiate a communication, such as a computer, a personal digital assistant (PDA), a laptop or electronic notebook, or any other device, component, element, or object capable of initiating voice, audio, or data exchanges within communication system 10. Endpoint 12*a* may also be inclusive of a suitable interface to the human user, such as a microphone, a display, or a keyboard or other terminal equipment. Endpoint 12*a* may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Wireless network 16 represents a series of points or nodes of interconnected communication paths for receiving and transmitting packets of information that propagate through communication system 10. Wireless network 16 offers a communicative interface between endpoint 12*a* and a content player in certain embodiments. It is important to note that wireless network 16 may implement any communications protocol such as dial, cable, digital subscriber line (DSL), radio, wireless local area network (WLAN), or any other suitable communications protocol that allows packet communications or tunneling to (or through) wireless network 16. Wireless network 16 may also include authentication features provided to endpoint 12*a*.

In a particular embodiment, wireless network 16 represents a wireless spectrum; however, wireless network 16 may alternatively be any suitable network where appropriate and according to particular needs. Wireless network 16 may be any local area network (LAN), WLAN, metropolitan area network (MAN), a virtual private network (VPN), or wide area network (WAN), or any other appropriate architecture or system that facilitates communications in a network environment.

Content source 30 is a server that provides content being requested in one example embodiment of the present invention. Alternatively, content source 30 could be a web site (or web server specifically), a router, a switch, an intermediary between two elements, or any other network appliance or device operable to offer or distribute content in a communications environment.

Turning to an operational perspective of the present invention, communication system 10 combines unicast and multicast mechanisms seamlessly and, further, provides access from standard client browsers instead of custom clients. Other systems (such as media servers) use unicast as a backup mechanism for multicast; however, these architectures do not attempt to automatically pick a transmission mechanism on a per-stream basis.

Communication system 10 can be described as having two significant parts; the first part is discussed here and the second part is discussed below with reference to FIG. 2. The first part is that an analysis of traffic patterns can determine what data to send over multicast and what to send over unicast (down to the endpoints). This is similar to a web caching protocol, except that a web caching protocol exploits redundancy in the temporal plane (people asking for the same content at different points in time) and communication system 10 exploits redundancy in the spatial plane (people asking for the same content at the same time). Communications system 10 can even be used to combine the two paradigms to get even more efficiency.

In operation, content player 20 can look at data being transmitted over a short time interval (the time being driven to some extent by how much data the endpoints (e.g., cellular phones) can buffer. Content player 20 can employ an algorithm to determine if there are enough people looking at the same content. If so, the system sends this content out over the multicast channel. If there is not a significant population requesting this content, the unicast channel can be used (unless, the utilization over the multicast channel is low, in which case more data can be sent over the multicast channel). This analysis (and processing) can be implemented in routers, switches, gateways, loadbalancers, etc. so that there is little additional overhead.

One multicast strategy is to send content in a loop; devices can join the loop at any time and cache all the bits of the clip (e.g., a video clip) before playing it out. Communication system 10 can look at content patterns and add them to the multicast transmission schedule. If something is being multicasted already, it would redirect unicast requests to the multicast version. Note that the term 'connect' is meant to encompass any directing, redirecting, distribution, or coupling of one element to the information that is being requested. A variant of the algorithm would be to keep sending the content out a couple times more over multicast (depending on bandwidth in use) once there are enough receivers for the last round of multicast for this particular content.

Where mobile differs from doing the same thing over the Internet is in the fixed-bandwidth nature of the broadcast channel. This means that the threshold of what can go over unicast and what can go over broadcast is determined by the current utilization of the broadcast channel. The basic idea is to get maximum spectral efficiency of the overall spectrum (unicast+broadcast), while maintaining broadcast channel utilization as close to 100% as possible. Thus, the traffic analysis should have external input from the RF subsystem to tune itself.

Content player 20 is a server in one example implementation. In other scenarios, content player 20 could be virtually any network element, or a separate box or anything that is capable of delivering content to another network component. As used herein in this Specification, the term 'content player' is meant to encompass routers, switches, gateways, bridges, loadbalancers, firewalls, or any other suitable device, network appliance, component, element, or object operable to exchange information in a network environment. Moreover, content player 20 may include any suitable hardware, software, components, modules, interfaces, or objects that facilitate the operations thereof. This may be inclusive of appropriate algorithms and communication protocols that allow for the effective delivery of data or information.

Content player 20 can be equipped with appropriate software to execute the described operations in an example embodiment of the present invention. Memory elements and processors (which facilitate these outlined operations) may be included in this device or provided externally to this device, consolidated in any suitable fashion. The processors can readily execute code (software) for effectuating the activities described. The memory elements can store information to be referenced by content player 20. As used herein in this document, the term 'memory element' is inclusive of any suitable database or storage medium (provided in any appropriate format) that is capable of maintaining information pertinent to the routing and/or processing operations of content player 20. For example, the memory elements may store such information in an electronic register, diagram, record, index, list, or queue. Alternatively, the memory elements may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

FIG. 2 is a simplified block diagram that includes an example endpoint 12*a*. Generally, endpoints 12*a*-12*n* can connect into multicast channel 18 and/or the unicast channel 22. Each endpoint can include a browser 40 and a proxy 50, which can have two (or potentially more) connections for accommodating multicasting and unicasting operations. Thus, the proxy can serve two functions successfully with respect to multicast and unicast activities. In other embodiments, the proxy can include just one of these items for receiving content. Note that the proxy could be installed on the endpoint via a simple download (much like the way many applications are loaded onto handheld devices currently). The end user may not even notice the difference after the upgrade, as the browser does not have to change. The proxy is essentially being configured behind the browser. Thus, a simple firmware update (or other similar invite to try a new service) could be used to update an endpoint (e.g., a cellular telephone) such that it would be capable of performing the operations, as outlined herein. In this sense, legacy endpoints could readily implement such a concept, as new endpoints would not have to be purchased to achieve the teachings of the present invention.

The second part of the concept tendered herein acts to replace the custom client on the phone with a proxy. The phone points to the proxy and, in turn, the proxy connects to the unicast and the multicast networks. It can implement all the caching and look-ahead operations for multicasts, as is needed. The proxy abstracts the multicast transport from the user. Thus, the user enjoys a better user experience due to multicast and caching. The carrier sees a higher spectral efficiency since more traffic is carried over broadcast. It is even possible for a carrier to deploy this using a small sliver of spectrum for broadcast initially and then gradually increasing this as the carriers witness bandwidth savings. Through the entire process, there are no custom clients or applications necessary, which makes it easy to deploy (and/or adopt) such a solution. Such technology could readily be applied to video on-demand technology, DVR technologies, or virtually any other system in which bandwidth is of some concern.

As identified earlier, on one example implementation, content player 20 includes software to achieve the optimal multicasting operations, as outlined herein in this document. Additionally, endpoint 12*a* includes software (e.g., as part of proxy 50) to help coordinate the multicasting activities. In other embodiments, this multicasting and unicasting coordination feature may be provided external to these devices (content player 20 and endpoint 12*a*) or included in some other network device to achieve this intended functionality. Alternatively, both content player 20 and the remote peer endpoint include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving multicasting and unicasting activities in a network environment.

Turning now to the example flow of FIG. 3, FIG. 3 is a simplified flowchart 100 that includes a series of example steps associated with an operation of communication system 10. The illustration of FIG. 3 has been provided for purposes of teaching only and, therefore, should be construed as such.

The flow begins at step 102, where data is received by content player 20 from any suitable source (e.g., content source 30). At step 104, the content received from the source is broken up into slices. The actual timing or the segmentation determinations can be made by content player 20. At step 106, a given end user or endpoint requests content (or the content is sent based on some subscription model, previous query, or some profile information of the end user, etc.). Note that the user could be asking for any portion of (for example) a video. In one sense, the user could be fast-forwarding through a video and, thereby, asking for some portion in the middle of the video, as opposed to requesting data from the beginning of the given video.

Continuing along the flow, at step 108, content player 20 evaluates whether a given portion of the content (i.e., a slice) has already been multicasted. If it has been multicasted, then the endpoint is connected (or redirected) to the multicast version of this data at step 110. If the slice has not been previously multicasted and, further, if more than one user has requested this slice (e.g., over some given designated time), then this slice is added to the multicast schedule at step 112. Furthermore, if no one is asking for this slice on the multicast schedule, then the request is ultimately discarded, processed, sent on a unicast channel, or resolved in some other alternative fashion.

Note that with the example provided above, as well as numerous other examples provided herein, interaction may be described in terms of two, or three network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 3 illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication platforms (e.g., wireless spectrums), communication system 10 may be applicable to other platforms, other routing protocols, or routed protocols in which packets are being sent to service endpoint requests for content. Any architecture in which bandwidth is of concern could benefit from the teachings of the present invention. Internet Protocol television (IPTV) over cable is another viable application for communication system 10.

Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112a as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
   segmenting content into clips to be delivered to one or more endpoints;
   receiving a request for the content from an endpoint; and
   evaluating whether a portion of the content has already been multicasted, wherein if the portion has been multicasted, then the endpoint is connected to a multicast version of the portion of the content, and wherein if the portion has not been previously multicasted then the portion of the content is added to a multicast transmission schedule if at least one other endpoint has requested the content.

2. The method of claim 1, wherein if the portion has not been previously multicasted then the portion of content is sent over a unicast channel.

3. The method of claim 1, wherein the request is based on a subscription model, or a previous query.

4. The method of claim 1, wherein the endpoint includes a proxy that coordinates with a content player to receive the multicast version.

5. The method of claim 4, wherein the proxy is coupled to a browser that enables the multicast version to be used by the endpoint.

6. The method of claim 4, wherein the content player includes a multiplexing function, and wherein the content player is configured to tune multicast activities it conducts based on bandwidth utilization in a network.

7. The method of claim 4, wherein the content player evaluates data being transmitted over a time interval and determines if there are enough endpoints requesting a content piece that is the same such that the content piece is sent over a multicast channel.

8. The method of claim 1, wherein an update is sent to the endpoint to configure a proxy in the endpoint for multicasting activities.

9. An apparatus, comprising:
   a content player configured to:
      request a piece of content from a content source;
      segment the piece of content into clips to be delivered to one or more endpoints;
      receive a request for content from an endpoint; and
      evaluate whether a portion of the content has already been multicasted, wherein if the portion has been multicasted, then the endpoint is connected to a multicast version of the portion of the content, and wherein if the portion has not been previously multicasted then the portion of content is added to a multicast transmission schedule if at least one other endpoint has requested the content.

10. The apparatus of claim 9, wherein the content player requests a piece of content from a content source and segments the piece of content into clips to be delivered to one or more endpoints.

11. The apparatus of claim 9, wherein if the portion has not been previously multicasted then the portion of content is sent over a unicast channel.

12. The apparatus of claim 9, wherein the request is based on a subscription model, or a previous query.

13. The apparatus of claim 9, wherein the endpoint includes a proxy that coordinates with the content player to receive the multicast version, and wherein the proxy is coupled to a browser that enables the multicast version to be used by an end user of the endpoint, and wherein the content player evaluates data being transmitted over a time interval and determines if there are enough endpoints requesting a piece of content that is the same such that the piece of content is sent over a multicast channel.

14. The apparatus of claim 9, wherein the content player includes a multiplexing function, and wherein the content player can tune multicast activities it conducts based on bandwidth utilization in a network.

15. A non-transitory media configured to:
   request a piece of content from a content source;
   segment the piece of content into clips to be delivered to one or more endpoints;
   receive a request for content from an endpoint; and
   evaluate whether a portion of the content has already been multicasted, wherein if the portion has been multicasted, then the endpoint is connected to a multicast version of the portion of the content, and wherein if the portion has not been previously multicasted then the portion of content is added to a multicast transmission schedule if at least one other endpoint has requested the content.

16. The media of claim 15, being further configured to:
request a piece of content from a content source; and
segment the piece of content into clips to be delivered to one or more endpoints.

17. The media of claim 15, wherein if the portion has not been previously multicasted then the portion of content is sent over a unicast channel, and wherein the request is based on a subscription model, or a previous query.

18. A system, comprising:
means for requesting a piece of content from a content source;
means for segmenting the piece of content into clips to be delivered to one or more endpoints;
means for receiving a request for content from an endpoint; and
means for evaluating whether a portion of the content has already been multicasted, wherein if the portion has been multicasted, then the endpoint is connected to a multicast version of the portion of the content, and wherein if the portion has not been previously multicasted then the portion of content is added to a multicast transmission schedule if at least one other endpoint has requested the content.

19. The system of claim 18, further comprising:
means for tuning multicast activities for a content player based on bandwidth utilization in a network.

20. The system of claim 18, wherein an update is sent to the endpoint to configure a proxy in the endpoint for multicasting activities.

* * * * *